United States Patent [19]

Haak

[11] Patent Number: 4,615,073
[45] Date of Patent: Oct. 7, 1986

[54] TREE TOPPING DEVICE HAVING HINGED, ADJUSTABLE CLAMPING MEMBERS

[76] Inventor: Raymond L. Haak, Rte. 3, Box 293, Alta Loma, Tex. 77510

[21] Appl. No.: 638,710

[22] Filed: Aug. 8, 1984

[51] Int. Cl.$^4$ .............................................. E05D 5/02
[52] U.S. Cl. ...................................... 16/253; 16/382; 144/34 B; 269/1; 269/45; 269/131
[58] Field of Search .................. 16/252, 253, 382; 269/1, 45, 130, 131; 144/34 R, 34 A, 34 B, 34 C, 34 D, 34 E, 34 F; 83/111, 112, 113, 119, 154

[56] References Cited

U.S. PATENT DOCUMENTS 3,548,899 12/1970 Emerson ............... 144/34 B X
4,253,649 3/1981 Hewson ..................... 269/45

FOREIGN PATENT DOCUMENTS 658789 3/1938 Fed. Rep. of Germany ...... 269/130

*Primary Examiner*—Fred Silverberg
*Attorney, Agent, or Firm*—Browning, Bushman, Zamecki & Anderson

[57] ABSTRACT

The present invention is directed to an apparatus and method for restricting the relative movement of the separated sections of an initially unitary body. The present invention is particularly useful in a device and method for restraining or restricting the initial movement of the upper portion of a tree, post or similar body to two degrees of freedom immediately after it has been severed from the remaining stationary portion of the body. A device in accord with the present invention comprises first and second rigid members pivotally joined or hinged together. The device further comprises a plurality of contact surfaces or feet for contacting the limb wherein the contact surfaces are displaced from the rigid members. Finally, the device comprises devices for attaching the rigid members to the limb both above and below the proposed point of severance. Most preferably, the attachment devices are adjustable to permit attachment to a limb having a variety of shapes.

9 Claims, 3 Drawing Figures

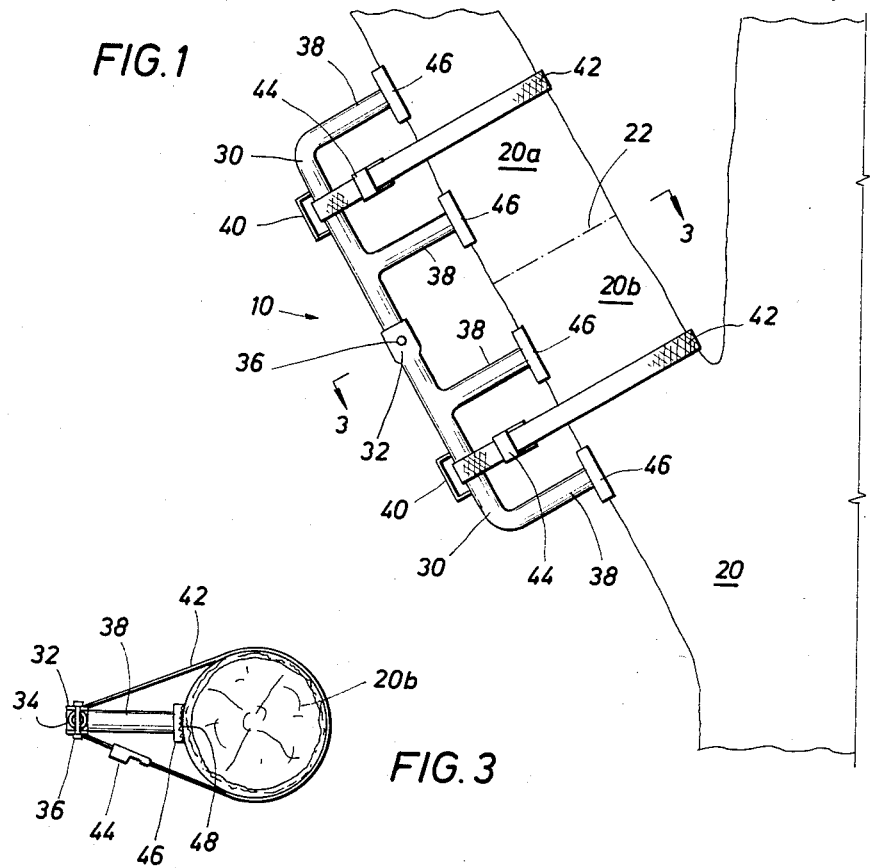
FIG. 1
FIG. 3
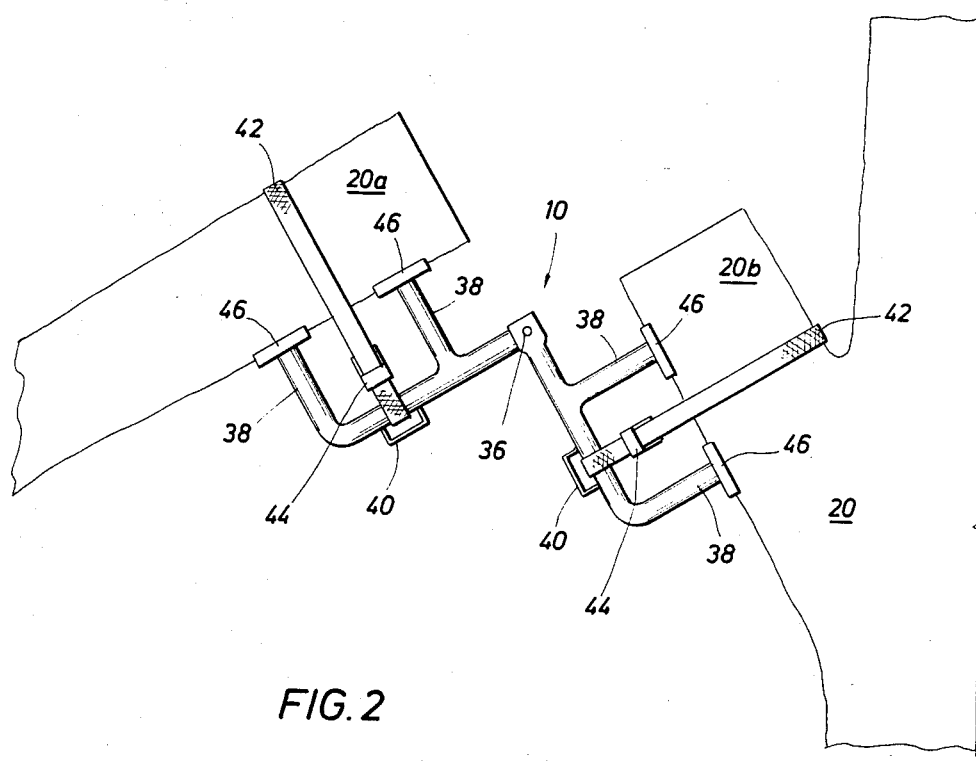
FIG. 2

TREE TOPPING DEVICE HAVING HINGED, ADJUSTABLE CLAMPING MEMBERS

BACKGROUND OF THE INVENTION

1. Field of the Invention

The present invention generally relates to an apparatus useful for restricting the relative movement of the separated sections of an initially unitary body. The present invention is particularly useful in a device for controlling the initial movement or displacement of a tree branch or limb after it has been separated from a standing tree trunk.

2. Description of the Background

A safety hazard often exists when it is desired or required to trim or remove the tops, limbs or major trunks of trees. At the instant of separation, a large force is often released which may cause the severed branch to kick or fall in an unexpected direction creating a dangerous and hazardous situation. This sudden release of force and the resulting unexpected movement has often been responsible for severe personal injury and damage to property. Although professional tree surgeons develop a degree of expertise in predicting these erratic movements, they are not immune from injury and unexpected damage resulting from this sudden movement. However, the majority of individuals engaged in the task of trimming or removing limbs and branches from trees or inexperienced amateurs, e.g., enterprising homeowners, who injure themselves in addition to causing others to suffer injury and property damage. The personal injury and property damage inflicted in tree trimming operations is most often the result of the sudden, uncontrolled and unrestricted movement of the separated limb or branch in a direction unpredicted by the individual.

Accordingly, there has been a long felt but unfulfilled need within the tree trimming and removal business, and particularly within the do-it-yourself or amateur segment of this business, for an apparatus useful for restricting the initial, relative movement of the separated sections of a unitary branch, limb, trunk or the like body.

SUMMARY OF THE INVENTION

The present invention provides a new and improved apparatus and method useful for restricting the relative movement of the separated sections of an initially unitary body. The disclosed device and method is particularly useful in improving the safety of those engaged in trimming, cutting, severing or removing trees, branches, limbs, poles or any other partially vertical body.

The apparatus of the present invention preferably comprises two structurally rigid members hinged or pivoted together at one end. Each rigid member comprises a means for displacing itself from and attaching itself to a body or limb to be severed so that relative motion will be prevented between the rigid member and the adjacent or attached portion of the limb resulting in controlling the motion of the severed portion of the limb. The displacement means of the apparatus of the present invention provides a gap or space between the apparatus and the body or limb to be removed to allow an easily accessible area for operation of the cutting or sawing device while the apparatus is attached to the limb. Further, the apparatus of the present invention includes means for contacting the body or limb at a plurality of points adjacent each rigid member. Finally, the apparatus of the present invention provides means for attaching the apparatus to bodies or limbs of varying diameter, circumference or shape. Preferably, the attachment means comprises adjustable means for encircling the body or limb and holding it rigidly in contact with the contact means of the rigid members.

The apparatus of the present invention solves the long felt but unfulfilled need for an apparatus useful for improving safety during the trimming, severing or removing of trees, limbs, branches, poles, posts and the like. The apparatus of the present invention is easily and inexpensively manufactured are employed. This apparatus significantly increases the safety and predictability of movement in the removal of unwanted branches, limbs and the like, particularly when used by an amateur tree trimmer. These and other meritorious features and advantages of the present invention will be more fully appreciated from the following detailed description and claims.

BRIEF DESCRIPTION OF THE DRAWINGS

Other features and intended advantages of the present invention will be more readily apparent by the references to the following detailed description in connection with the accompanying drawings, wherein:

FIG. 1 is a side illustration of a device in accord with the present invention and attached to a tree limb;

FIG. 2 is a side illustration of a device in accord with the present invention and attached to a severed tree limb; and FIG. 3 is a cross-sectional illustration of a device in accord with the present invention through the section 3—3 of FIG. 1.

While the invention will be described in connection with the presently preferred embodiment, it will be understood that it is not intended to limit the invention to this embodiment. On the contrary, it is intended to cover all alternatives, modifications and equivalents as may be included in the spirit of the invention as defined in the appended claims.

DETAILED DESCRIPTION OF THE PREFERRED EMBODIMENT

An apparatus in accord with the present invention useful for restricting the relative movement of the separated sections of an initially unitary body is illustrated in FIG. 1. A presently preferred embodiment of the safety device 10 comprises two structurally rigid members 30 interconnected by any appropriate means such as a conventional hinge or pivot. For example, in the illustrated device, a hinge or pivot is formed by the cooperation of a fork 32 on one end of the first rigid member 30 with the end 34 of the second rigid member 30 employing hinge pin 36. The hinge or pivot means permits the device 10 to control or limit the motion and degree of freedom between the structurally rigid members 30.

Each rigid member 30 is further characterized by means for displacing the limb 20 or other workpiece therefrom. For example, a plurality of displacement members or standoffs 38 conveniently extend from each rigid member 30 to displace from the rigid member 30 feet 46 or other means for contacting the limb 20. In a presently preferred embodiment, each rigid member includes a plurality of surfaces or feet 46 for contacting the limb 20 or workpiece. Each contact surface 46 comprise a foot or pad of any appropriate shape and preferably includes cleats or claws 48 for engaging or minimally penetrating the surface of the limb 20 to maintain better contact with and control over the limb.

Those skilled in the art will appreciate that the above-described device and parts thereof are conveniently constructed of any material having the required structural strength and conveniently formed, cast, molded or manufactured into the desired shapes. This device must be able to withstand the forces and stresses encountered when the limb 20 is severed at 22 into a severed portion 20a and a fixed portion 20b. Convenient construction materials include tubular iron or steel, although those skilled in the art will recognize that any material having the required structural strength to accomplish the purposes of this invention, e.g., magnesium, aluminum, certain plastics and the like, may be employed in such a device.

Finally, the illustrated device in accord with the present invention further includes a means for attaching the rigid members 30 to the limb 20 at a portion 20b intended to remain stationary and a portion 20a intended to be severed on opposite sides of the plane of severance 22. The attachment means is preferably adjustable to allow for attaching the safety device 10 to limbs 20 of variable perimeter, circumference or shape. A convenient and inexpensive attachment means comprises a plurality of nylon or other strong belts 42, each for cooperation with a rigid member 30, e.g., by passing through a loop 40 attached to each rigid member 30. Adjustment of the buckle 44 or other adjustment device on the belt 42 permits the size of the belt 42 to be altered to accommodate passage about limb 20 of a variety of sizes. The belt 42 is easily and conveniently looped about the limb 20 as illustrated and tightened using buckle 44 to temporarily engage the limb 20 with the contact feet 46 of each rigid member 30 of the device 10 of the present invention. Those skilled in the art will recognize that any convenient means for temporarily attaching the device of the present invention to a limb may be employed. Other such means include a hook cooperating with a chain, cable or rope or appropriate wire or strapping cooperating with a suitable tensioning device. Those skilled in the art will recognize that any means for attaching capable of accommodating the expected shape and size of objects and having the necessary tensile strength to produce the desired restriction of motion between the severed and stationary members may be employed.

The foregoing description of the invention has been directed in primary part to a particular preferred embodiment in accordance with the requirements of the patent statutes and for purposes of explanation and illustration. It will be apparent, however, to those skilled in the art that many modifications and changes in the specifically described apparatus may be made without departing from the scope and spirit of the invention. For example, any appropriate hinge or pivot means and any appropriate attachment means may be employed. Further, the apparatus of the present invention may additionally include means for controlling the movement of the severed body away from the device of the present invention, e.g., means for slowly and safely lowering a severed limb to the ground. Therefore, the invention is not restricted to the particular form of construction illustrated and described, but covers all modifications which may fall within the scope of the following claims.

It is applicant's intention in the following claims to cover such modifications and variations as fall within the true spirit and scope of the invention.

What is claimed is:

1. An apparatus useful for controlling the relative movement of a section severed from an initially unitary body in order to improve the safety in severing said section from said body, comprising:
   two structurally rigid, elongated members;
   hinge means comprising a hinge pin for permanently joining together said rigid members at one end thereof and restricting the motion of said rigid members to a single plane;
   means for displacing said rigid members from said body, said displacing means comprising a plurality of standoffs extending from each of said rigid members, said standoffs being longitudinally disposed along each of said rigid members, all of said standoffs lying in said single plane; and
   adjustable means for attaching said rigid members at said standoffs to said body, each said adjustable means disposed from one of said rigid members and disposed between two standoffs on said member.

2. The apparatus of claim 1 wherein said rigid members, hinge means, displacement means and attachment means control and restrict said relative movement of said section predictably to said single plane.

3. An apparatus useful in cutting a large branch from a tree by preventing the uncontrolled separation and fall of the severed portion of said branch from the line of severance with the standing portion of said tree, comprising:
   a first, elongated, structurally rigid member;
   first means for gripping said branch extending from said first rigid member, said first gripping means capable of gripping said branch at a location on a first side of said line of severance in a rigid position relative to said first rigid member;
   a plurality of first means for displacing said first rigid member from said branch at a location on said first side of said line of severance, said first displacing means extending from said first member and being longitudinally disposed along said first member for cooperation with said gripping means for rigidly engaging said branch at a plurality of contact points;
   a second, elongated, structurally rigid member;
   second means for gripping said branch extending from said second rigid member, said second gripping means capable of gripping said branch at a location on a second side of said line of severance in a rigid position relative to said second rigid member;
   a plurality of second means for displacing said second member from said branch at a location on said second side of said line of severance, said second displacing means extending from said second member and being longitudinally disposed along said second member for cooperation with said second gripping means for rigidly engaging said branch at a plurality of contact points; and
   hinge means comprising a hinge pin for permanently joining together said rigid members at one end thereof, said rigid members joined in a position so that said hinge means permits relative movement of said first and second rigid members only in a single plane and wherein said first and second displacing means always remain in said single plane.

4. The apparatus of claim 3 wherein said first and second gripping means are adjustable.

5. The apparatus of claim 4 wherein said first and second gripping means comprise a belt and buckle.

6. The apparatus of claim 3 wherein said first displacing means comprises two first standoffs projecting from said rigid member and said second displacing means comprises two second standoffs projecting from said rigid member.

7. The apparatus of claim 6 wherein said first gripping means is disposed from said first rigid members between said two first standoffs and said second gripping means is disposed from said second rigid member between said two second standoffs.

8. The apparatus of claim 7 wherein said first and second gripping means are adjustable.

9. The apparatus of claim 8 wherein said first and second standoffs further comprise on the ends distal from said rigid members cleats for engaging said branch.

* * * * *